UNITED STATES PATENT OFFICE 2,086,881

PRODUCTION OF NICKEL AND IRON CARBONYLS

Leo Schlecht and Max Naumann, Ludwigshafen-on-the-Rhine, Germany, assignors to I. G. Farbenindustrie Aktiengesellschaft, Frankfort-on-the-Main, Germany No Drawing. Application January 30, 1933, Serial No. 654,244. In Germany February 3, 1932

10 Claims. (Cl. 23—203)

The present invention relates to the production of the carbonyl compounds of nickel and iron, more particularly from so-called mattes or stones or similar metallurgical products. These initial materials contain nickel, or iron, or both nickel and iron, and sulphur, and often also other metals, in particular noble metals and heavy base metals which are capable of combining with sulphur to form sulphides such as copper or cobalt; it is probable that in these materials the sulphur is present in some form of chemical combination, though very often the composition does not in any way correspond to that of the common heavy metal sulphides such as nickel sulphide, or ferrous and ferric sulphides. The said materials are all characterized by having been obtained by a melting operation, and in consequence thereof they have a dense crystalline structure; when they are in the form of more or less coarse lumps they have a glittering, metallic appearance; in the form of a powder passing through a sieve having 100 meshes per square centimetre, they have a high apparent specific gravity of at least 3 and often as high as 4 or even more, whereas heavy metal sulphides obtained by a wet precipitation process have an apparent specific gravity of only about 1. Accordingly, it is a quite particular kind of initial materials which the process according to the present invention makes use of for the production of the carbonyl compounds of iron and nickel, and all initial materials of this type are hereinafter collectively referred to, for the sake of brevity, as "matte".

For the purpose of making the carbonyl compounds of nickel and iron, it has hitherto been customary to start from initial materials which contain iron, or nickel, or both, in the metallic form. Such initial materials have been prepared by the reduction of the oxides of nickel or iron or of materials containing such oxides. In case the carbonyls of nickel or iron were to be prepared from materials containing nickel or iron in another form than that of metal or oxide it has been customary first to convert the initial substances into an oxidic state so that thereafter a reducing treatment of the kind referred to above could successfully be applied. Thus in the well known Mond process for the production of nickel use has been made as the starting material very often of the metallurgical products known as nickel stone or nickel matte which in addition to nickel contain varying amounts of sulphur and as a rule also other metals. In order to successfully treat such nickel mattes for the production of nickel carbonyl the material has been subjected first to a careful roasting operation and then to a reduction treatment under moderate conditions so as to produce a material containing the nickel in the metallic form and in a most finely divided state, and it was only this material that was acted upon with carbon monoxide to produce nickel carbonyl.

It is also known that sulphur or sulphur compounds may, in some cases, be not injurious to, or even have a beneficial action on, the formation of the metal carbonyls. It has even been found possible to prepare the carbonyls of nickel and iron by starting directly from such compounds of the said metals which can be reduced by carbon monoxide to the metallic state as for example the oxides or sulphides of nickel and iron and to treat these directly with carbon monoxide under conditions at which simultaneously the reduction of the said compounds to the free metals and the formation of the metal carbonyls take place. In this process a substantial proportion of the carbon monoxide admitted into the reaction vessel is consumed for the reduction in that either carbon dioxide in the case of metallic oxides or carbon oxysulphide in the case of metallic sulphides is formed. Therefore, in case the carbon monoxide which leaves the reaction vessel unaltered is to be used again in a circular course, it is necessary in most cases to remove therefrom the carbon dioxide or oxysulphide before again admitting the carbon monoxide into the reaction vessel. Furthermore, it has been found advisable in the aforesaid process to employ the initial materials used for the interaction with carbon monoxide in a finely subdivided state such as is obtained by a wet precipitation process so that they present a very large surface.

In other cases sulphur or sulphur compounds have been found to act highly detrimentally on the formation of iron and nickel carbonyl. Thus, when a nickel matte is subjected to an incomplete roasting treatment, so that a substantial portion of the sulphur initially present is left in the material, the formation of nickel carbonyl proceeds usually very slowly, if at all, even if after the incomplete roasting the material has been subjected to a reduction treatment under moderate conditions so as to produce a highly porous metal.

The aforesaid prior processes therefore are more or less tedious in practice when sulphidic initial materials are to be converted into metal carbonyls, and furthermore they involve very often other disadvantages such as the consumption of large amounts of carbon monoxide for reducing the sulphides to the metallic state whereby carbon oxysulphide is formed. It is probably for these reasons that there is still a great demand for a simple and economical process for making metal carbonyls from such materials as mattes containing nickel, or iron, or both. Such a process is desirable because the metal carbonyls can be readily converted into the free metals by thermal decomposition and since on the other hand it is very difficult to recover iron and especially nickel from mattes by metallurgical methods, especially in case the mattes also contain copper.

We have now made the surprising discovery that mattes which contain nickel, or iron, or both nickel and iron, can be used directly for the production of metal carbonyl and that by the action of carbon monoxide or gases containing carbon monoxide on the said materials at elevated temperatures and preferably under superatmospheric pressures, nickel carbonyl, or iron carbonyl, or both nickel and iron carbonyl, are obtained at a sufficiently rapid rate to permit the use of this reaction for work on an industrial scale. It is very surprising that initial materials of the said nature react very readily and rapidly with carbon monoxide, especially in view of the fact that when these materials are subjected to other strong chemical attacks, even so strong attacks as roasting, they react very difficultly and special precautions, in particular a far reaching comminution, are necessary in order to effect a quick and complete progress of the reaction.

The process according to the present invention may be carried out at atmospheric pressure; generally speaking, however, it is better to use superatmospheric pressures of for example at least 2 atmospheres, and usually higher pressures are to be preferred, as for example 5, 10 or 20 atmospheres; we prefer to use pressures of 50, 100 or 200 atmospheres or even more. The temperature used should be at least 50° C. and may be as high as is permissible with regard to the possible decomposition of carbon monoxide in accordance with the equation

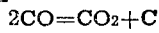
$$2CO = CO_2 + C$$

Generally speaking the temperature will range between 50° and 325° C. and usually between 140° and 300° C. We prefer to work at temperatures between about 180° and 275° C.

As regards the temperature and pressure to be maintained during the reaction with carbon monoxide for the purpose of forming carbonyl, it should also be noted than an increase in temperature should be attended by a corresponding increase in pressure, or otherwise the yield may be impaired. It is sometimes advantageous to increase the temperature and/or the pressure in stages or continually during the treatment with carbon monoxide, within the limits specified above.

The speed of flow of the carbon monoxide or gases containing the same, such as water gas, producer gas or illuminating gas, likewise influences the speed of reaction in that increase in the speed of flow usually leads to an increase in yield.

Of course, the speed of the gas should not be so high that too much heat is removed from the reaction space or that the carbon monoxide remains in contact with the matte only for a time insufficient for complete reaction. However, when working at 200 atmospheres, the speed of the gas may be as high as 2500 cubic metres (measured at atmospheric pressure and room temperature) of gas per each cubic metre capacity of the reaction vessel and per hour. If the gas be led in a cycle, it is often advisable to remove impurities which are present or which have been produced therein, such as carbon oxysulphide, carbon dioxide and water vapour, and it is preferable to regenerate the carbon monoxide from the removed impurities. In this connection it is of advantage that the process according to the present invention is but slightly sensitive to those substances which are usually known as injurious, such as oxygen.

We shall now explain our new process in detail first by reference to the treatment on an initial material containing only nickel and sulphur in chemical combination. When a matte of this kind is acted upon with carbon monoxide at elevated temperatures and under superatmospheric pressures, the formation of nickel carbonyl proceeds satisfactorily up to a certain point, namely until so much of the nickel present has been consumed that the remaining material corresponds about to the formula NiS. When this stage has been reached no further progress of the reaction is observed even when increasing the pressure to as much as about 200 atmospheres. It is only when using substantially higher pressures as for example 1000 atmospheres or even more that also the remaining nickel sulphide undergoes conversion with the carbon monoxide but in this case the sulphur also reacts with carbon monoxide with the formation of carbon oxysulphide so that a substantial proportion of the carbon monoxide is used up for the said by-reaction.

Similarly when starting from a matte containing iron and sulphur only, carbonyl formation takes place at pressures up to about 200 atmospheres until the composition of the remaining mass corresponds about to the formula $FeS_2$ whereby no carbon oxysulphide is formed, and it is only at substantially higher pressure of for example 1000 or 2000 atmospheres that also the remaining iron sulphide reacts with carbon monoxide whereby iron carbonyl and carbon oxysulphide are formed simultaneously.

The matter is somewhat different when in addition to nickel and sulphur or iron and sulphur other heavy metals capable of combining with sulphur are present. The behaviour of such more complex mattes may be explained by reference to a material composed of nickel, sulphur and copper. If about so much sulphur is present that it can combine with the copper to form cuprous sulphide $Cu_2S$ the formation of nickel carbonyl proceeds until the nickel is used up completely or nearly completely. When, however, more sulphur is present than can combine with the copper to form cuprous sulphide, the remainder of the sulphur combines with the nickel to form nickel sulphide and only the remaining nickel is converted with carbon monoxide at pressures up to 200 atmospheres. When higher pressures are used also the nickel combined as nickel sulphide reacts with the carbon monoxide with the simultaneous formation of nickel carbonyl and carbon oxysulphide.

Mattes composed of iron, sulphur and another heavy metal capable of combining with sulphur behave in a similar manner.

When both nickel and iron are present the nickel tends to react with the carbon monoxide first. It is possible in this case by using comparatively moderate conditions for the interaction with carbon monoxide to combine the sulphur present with the iron and to practically completely convert the nickel into nickel carbonyl without any substantial formation of carbon oxysulphide. On the other hand it is also possible to simultaneously carry on the conversion of both nickel and iron into their carbonyls and in this case the carbonyl mixture formed may subsequently be separated into its components, as for example in accordance with the process described and claimed in the copending application by Carl Mueller, Leo Schlecht, and Emil Keunecke, Ser. No. 637,200, filed October 10th, 1932, now Patent No. 2,004,534, issued June 11, 1935.

In the process according to the present invention the sulphur present has a highly favorable effect on the formation of the metal carbonyls, even though the sulphur has been introduced into or combined with the initial material at the high temperatures of the smelting operation. It is due to this effect that it may be advisable, in the refining of impure nickel or iron by the carbonyl process, to prepare a matte by fusing the impure nickel or iron with nickel sulphide or iron sulphide or with other sulphides or also sulphur, and to subject the resulting matte to the action of carbon monoxide instead of acting with carbon monoxide directly on the impure nickel or iron.

On the other hand, it is due to the favorable action of the sulphur on the formation of the metal carbonyls, that the sulphur content of the matte to be treated should preferably not be very low; generally speaking, the amount of sulphur present should as a rule be at least 2 per cent by weight of the matte and preferably substantially higher, but the most favorable amount of sulphur also depends on the amount of other metals present. Thus, when treating a matte composed of nickel, sulphur and copper, but free or substantially free from iron, the amount of copper should preferably be at least twice that of the sulphur, in which case at least about 85 per cent of the nickel present may be converted into nickel carbonyl; when working with an amount of copper of 4 or 5 times that of the sulphur present, the nickel is converted into nickel carbonyl completely or nearly so. When treating a matte composed of nickel, iron and sulphur, but free or substantially free from copper, the amount of sulphur should preferably be up to about 40 per cent by weight of the iron present. When a matte containing nickel, sulphur, and both iron and copper is to be treated, the amount of sulphur may advantageously be up to about 25 per cent by weight of the iron and copper present.

As will be seen from the foregoing explanations, the process according to the present invention is applicable to a great variety of initial materials. The intermediate products known as nickel stone or nickel matte, such as are obtained for example in the recovery of nickel from nickel ores, may be worked up with great advantage in the said manner. These products consist wholly or partly of sulphur compounds, the composition of which varies within wide limits, depending both on the impurities present in addition to the nickel, such as copper, iron, cobalt and compounds of these metals, and on the content of sulphur.

According to the present invention, nickel stone or nickel matte from different sources and having different pre-treatments and compositions may be employed. Iron contents which are multiples of the nickel content do not injuriously affect the reaction; neither do copper contents of the said order. It is mainly from an economic point of view that it is decided whether to start with a crude matte, a concentrated matte or a refined matte or whether for example copper should be wholly or partly removed in the usual manner by the so-called "top-bottom smelting", i. e. by fusing with sodium sulphide whereby a bottom layer rich in nickel and a top layer rich in copper are obtained.

In many cases it is preferable, either during their production or subsequently, to subject the initial materials containing sulphur to a special treatment whereby their surface is enlarged in order to increase their reactivity to carbon monoxide. Thus for example it is advantageous to impart a blistered, foamy structure to the matte, or to granulate it for example by pouring the molten material into water or by spraying. In some cases a comminution, or even a grinding to powder, may be carried out before the reaction with carbon monoxide. This combination proceeds very readily.

If mattes which contain iron are employed, there are two possible ways of proceeding; either the carbon monoxide is caused to act at the lowest possible pressures and temperatures in order to convert substantially only the nickel into carbonyl, the temperature and pressure later being increased in order to recover the iron wholly or partially; or conditions are employed under which the iron is also wholly or partly attacked, the constituents of the resulting mixture of carbonyls then being separated. The said separation may be effected during the separation of the carbonyls from the gas stream by fractional condensation.

The residue remaining after the formation of carbonyl may be worked up in any suitable manner; the said residues are frequently excellent initial materials for the recovery of copper or noble metals such as gold and platinum.

The advantages which the employment of the mattes for the carbonyl process offers reside mainly in their cheapness, their high specific gravity by which a good utilization of space in the reaction chamber is ensured and the fact that the mattes, owing to their dense, crystalline structure, do not tend to form light particles of dust whereby industrial working with flowing carbon monoxide in circulation and under pressure in shaft furnaces is considerably facilitated. Furthermore the process according to the present invention renders it possible to obtain nickel from nickel ores in only three stages, namely concentration by smelting to a matte, the action of carbon monoxide on the mattes and the thermal decomposition of the resulting carbonyl into the free metal and carbon monoxide, and moreover the time required for producing pure nickel from the initial material is very short, for example about 72 hours, so that only comparatively small quantities of nickel material are under treatment at a time, which means a great saving in the capital required.

The following examples will further illustrate the nature of this invention but the invention is not restricted to these examples.

*Example 1*

A crude matte containing about 25 per cent of nickel, 55 per cent of iron and 20 per cent of sulphur obtained from an iron-containing nickel ore by smelting with gypsum, lime and carbon, is treated with streaming carbon monoxide under a pressure of 200 atmospheres. The treatment lasts for 8 hours, the temperature being gradually raised from 200° to 275° C. The speed of flow of the carbon monoxide is about 15 liters (of gas under 200 atmospheres' pressure) per hour per kilogram of crude matte. 99 per cent of the nickel present is recovered as carbonyl. The residue contains practically all the sulphur combined with iron.

After the iron carbonyl simultaneously formed has been separated from the nickel carbonyl by distillation, the nickel carbonyl is thermally decomposed in the free space of a heated vessel and thereby pure nickel is obtained in the form of a fine powder.

Example 2

A copper nickel matte consisting of about 38 per cent of nickel, 48 per cent of copper, 3 per cent of iron and the remainder mainly sulphur is treated for 6 hours at 200° C. with flowing carbon monoxide under a pressure of 200 atmospheres. The resulting carbonyl is separated from the gas by cooling to 20° C. under pressure, the pressure being then released in stages. A 100 per cent yield of nickel carbonyl is obtained.

Example 3

Refined nickel matte, consisting of about 75 per cent of nickel, the remainder being mainly sulphur, is fused with copper chips. The resulting copper nickel matte contains 38 per cent of nickel, 50 per cent of copper and 10 per cent of sulphur. By treating this matte with carbon monoxide under a pressure of 200 atmospheres at from 200° to 275° C., the nickel is obtained so completely in the form of carbonyl within 10 hours that nickel can no longer be detected in the residue.

Mattes obtained by smelting the following products may also be worked up with similar results: iron-containing refined matte with Monel metal waste, iron sulphide or pyrites or copper sulphide with nickel or nickel alloys, such as Monel metal, Permalloy and the like.

If a matte contains a very large amount as for example more than 30 per cent of sulphur, a part thereof may be removed by oxidation or reduction, and then a matte poorer in sulphur is formed by smelting. Furthermore a thoroughly roasted matte may be smelted with a matte containing sulphur in order to obtain a material poorer in sulphur.

Example 4

The residue, consisting mainly of copper and sulphur obtained from a nickel copper concentration matte by treatment with carbon monoxide is fused with waste metallic nickel. The resulting matte containing about 65 per cent of nickel, 30 per cent of copper and 5 per cent of sulphur yields the nickel almost completely as carbonyl by treatment with streaming carbon monoxide under a pressure of 200 atmospheres at from 200° to 300° C. The residue may be fused with nickel again. In this case it is not necessary to remove the nickel completely in the form of its carbonyl, before the residue is used for the smelting operation, and in this way the time required for the formation of the carbonyl is considerably shortened and the reaction vessel can better be utilized.

Instead of nickel, nickel compounds, such as nickel oxide, or mixtures of copper and nickel salts, may be wholly or partly employed for the fusion with the copper-sulphur-residue.

Example 5

Refined nickel matte containing about 20 per cent of sulphur is smelted with about the same amount of impure metallic nickel. The smelted product is treated with streaming carbon monoxide under a pressure of 200 atmospheres at 200° C. until the sulphur content of the material has risen to 40 per cent. The pressure treatment is then interrupted, the residue smelted with a fresh quantity of nickel chips and the carbonyl-forming process repeated.

Example 6

A crude matte containing about 50 per cent of iron, 30 per cent of nickel and 20 per cent of sulphur is divided into two batches, one being reduced to pieces about 3 centimeters in diameter and the other to pieces of about 3 millimeters in diameter. The two batches are treated for the same time and under identical conditions with carbon monoxide under a pressure of 200 atmospheres at 200° C. In the first case the yield of nickel carbonyl is 90 per cent and in the latter case 98 per cent.

Example 7

A material obtained by melting together metallic wastes and containing about 40 per cent of nickel, 40 per cent of molybdenum, 8 per cent of sulphur and also some copper, iron and other impurities is acted upon with streaming carbon monoxide at between 200° and 300° C. under a pressure of 220 atmospheres. In this way 95 per cent of the nickel present is converted into nickel carbonyl.

Example 8

Impure scrap iron is melted in a cupola furnace with so much pyrites that the resulting matte contains about 10 per cent of sulphur. The mass is comminuted until the particles have an average size of 5 millimeters and then acted upon with streaming carbon monoxide under a pressure of 200 atmospheres at from 200° to 275° C. In the course of 10 hours about 75 per cent of the initial material is converted into iron carbonyl. The remaining residue contains nearly all the sulphur initially present.

The said residue is fused in a cupola furnace with 3 times its weight of scrap iron. When acting on the resulting material with carbon monoxide, iron carbonyl is formed until practically all of the added scrap iron is used up. The remaining residue may be used in further smelting operations, until the impurities of the scrap iron, such as tin, chromium and silicon, which accumulate therein, begin to cause trouble in the formation of the carbonyl.

Example 9

Scrap iron is smelted with so much copper and sulphur that the amount of these two substances is about 30 per cent by weight of the resulting matte, the proportion of copper to sulphur corresponding about to the formula $Cu_2S$. The comminuted matte is acted upon with streaming carbon monoxide under a pressure of 200 atmospheres and at a temperature of from 140° to 250° C., whereby the iron is converted into iron carbonyl. The residue contains the copper and sulphur and may be used for a further smelting operation.

Example 10

A nickel matte containing about 35 per cent of nickel, 18 per cent of copper, 32 per cent of iron and 15 per cent of sulphur is filled into the upper part of a vertical high-pressure reaction vessel provided with a false bottom consisting of a sieve plate in ⅓ of its height, the upper part of the vessel being capable of being heated electrically and the lower part being cooled by the atmosphere. The upper part of the vessel is heated to 220° C. and carbon monoxide is pressed in, until a pressure of 200 atmospheres is set up, which is maintained during the reaction by continuously supplying further amounts of carbon monoxide. A liquid mixture of the carbonyls of iron and nickel collects in the lower part of the vessel and is continuously withdrawn therefrom. In this way more than 90 per cent of the nickel and more than 50 per cent of the iron present are converted into the corresponding carbonyls.

What we claim is:—

1. The process of producing a carbonyl compound of at least one of the metals nickel and iron, which comprises reacting a "matte", containing from appreciably above 5 to 30 per cent of original sulphur and also containing at least one of the metals nickel and iron, with carbon monoxide at a temperature above 50° C. and under a pressure of at least 20 atmospheres.

2. The process as claimed in claim 1 in which a "matte" is used which also contains a heavy base metal different from iron and nickel and capable of combining with sulphur.

3. The process as claimed in claim 1 in which a "matte" is used which contains nickel, iron and sulphur, but only subordinate amounts of copper, the sulphur present amounting to at the most 40 per cent by weight of the iron.

4. The process as claimed in claim 1 in which a "matte" is used which contains nickel, copper and sulphur, but only subordinate amounts of iron, the sulphur present amounting to at the most 20 per cent by weight of the copper.

5. The process as claimed in claim 1 in which a "matte" is used which contains nickel, iron, copper and sulphur, the sulphur present amounting to at the most 25 per cent by weight of the iron and copper present.

6. The process as claimed in claim 1 in which the initial material used is a nickel matte.

7. The process of producing a carbonyl compound of at least one of the metals nickel and iron, which comprises reacting a "matte", containing from appreciably above 5 to 30 per cent of original sulphur and also containing at least one of the metals nickel and iron, with carbon monoxide at a temperature between 180° and 275° C. and under a pressure between 50 and 200 atmospheres.

8. The process of producing nickel carbonyl which comprises reacting a "matte" composed of nickel, iron and 20 per cent of original sulphur with carbon monoxide under a pressure of 200 atmospheres and at from 200° to 275° C.

9. The process of producing nickel carbonyl which comprises reacting a "matte" composed of nickel, copper, iron and 11 per cent of original sulphur with carbon monoxide under a pressure of 200 atmospheres and at 200° C.

10. The process of producing iron carbonyl which comprises reacting a "matte" composed of iron and 10 per cent or original sulphur with carbon monoxide under a pressure of 200 atmospheres and at from 200° to 275° C.

LEO SCHLECHT.
MAX NAUMANN.